(12) United States Patent
Mori et al.

(10) Patent No.: US 11,224,929 B2
(45) Date of Patent: Jan. 18, 2022

(54) ARC WELDING METHOD

(71) Applicant: DAIHEN CORPORATION, Osaka (JP)

(72) Inventors: Daisuke Mori, Osaka (JP); Zhongjie Liu, Osaka (JP); Toshiro Uezono, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 855 days.

(21) Appl. No.: 15/110,855

(22) PCT Filed: Feb. 9, 2015

(86) PCT No.: PCT/JP2015/053495
§ 371 (c)(1),
(2) Date: Jul. 11, 2016

(87) PCT Pub. No.: WO2015/125642
PCT Pub. Date: Aug. 27, 2015

(65) Prior Publication Data
US 2016/0332247 A1 Nov. 17, 2016

(30) Foreign Application Priority Data
Feb. 24, 2014 (JP) .............................. JP2014-032968

(51) Int. Cl.
*B23K 9/09* (2006.01)
*B23K 9/173* (2006.01)
(Continued)

(52) U.S. Cl.
CPC ............ *B23K 9/092* (2013.01); *B23K 9/0956* (2013.01); *B23K 9/1062* (2013.01); *B23K 9/173* (2013.01)

(58) Field of Classification Search
CPC . B23K 9/00; B23K 9/09; B23K 9/092; B23K 9/091; B23K 9/0956; B23K 9/10
(Continued)

(56) References Cited

U.S. PATENT DOCUMENTS 5,317,116 A * 5/1994 Tabata ................. B23K 9/0734
219/130.31
5,990,445 A 11/1999 Ogasawara et al.
(Continued)

FOREIGN PATENT DOCUMENTS

| CN | 102271853 | 12/2011 |
| CN | 103567603 | 2/2014 |

(Continued)

OTHER PUBLICATIONS

Office Action issued in China Patent Appl. No. 201580002827.9, dated May 3, 2017 , along with an English translation thereof.
(Continued)

*Primary Examiner* — Robert J Utama
*Assistant Examiner* — Ayub A Maye
(74) *Attorney, Agent, or Firm* — Greenblum & Bernstein, P.L.C.

(57) ABSTRACT

There is provided an arc welding method. In the method, welding is performed in a spray transfer mode by feeding a welding wire. A first welding current Iw1 is flown during a first period. A second welding current Iw2 is flown during a second period. A third welding current Iw3 is flown during a third period, where 0<Iw2<Iw3<Iw1. The first to third periods are alternately repeated.

9 Claims, 13 Drawing Sheets

(51) Int. Cl.
*B23K 9/095* (2006.01)
*B23K 9/10* (2006.01)

(58) Field of Classification Search
USPC ..... 219/130.1, 130.5, 130.4, 130.21, 130.51, 219/137 PS
See application file for complete search history.

(56) References Cited

U.S. PATENT DOCUMENTS

| | | | | |
|---|---|---|---|---|
| 6,248,976 | B1* | 6/2001 | Blankenship | B23K 9/0953 |
| | | | | 219/130.21 |
| 6,376,802 | B1* | 4/2002 | Tong | B23K 9/08 |
| | | | | 219/130.21 |
| 6,600,135 | B2* | 7/2003 | Tong | B23K 9/09 |
| | | | | 219/130.51 |
| 6,833,529 | B2* | 12/2004 | Ueyama | B23K 9/092 |
| | | | | 219/130.21 |
| 7,173,214 | B2* | 2/2007 | Nadzam | B23K 9/092 |
| | | | | 219/130.21 |
| 7,304,269 | B2* | 12/2007 | Fulmer | B23K 9/0738 |
| | | | | 219/130.21 |
| 8,101,886 | B2* | 1/2012 | Nakahara | B23K 9/091 |
| | | | | 219/137 PS |
| 8,816,250 | B2* | 8/2014 | Koshiishi | B23K 9/092 |
| | | | | 219/130.1 |
| 2006/0138115 | A1* | 6/2006 | Norrish | B23K 9/09 |
| | | | | 219/137.71 |
| 2007/0210048 | A1* | 9/2007 | Koshiishi | B23K 9/092 |
| | | | | 219/130.51 |
| 2007/0246448 | A1 | 10/2007 | Nishisaka et al. | |
| 2008/0006612 | A1* | 1/2008 | Peters | B23K 9/04 |
| | | | | 219/76.14 |
| 2009/0026186 | A1* | 1/2009 | Ueda | B23K 9/092 |
| | | | | 219/130.51 |
| 2012/0145691 | A1 | 6/2012 | Fujiwara et al. | |
| 2013/0228555 | A1 | 9/2013 | Peters | |
| 2015/0190877 | A1* | 7/2015 | Plottier | B23K 9/095 |
| | | | | 219/137 R |

FOREIGN PATENT DOCUMENTS

| | | |
|---|---|---|
| EP | 1681123 | 7/2006 |
| JP | 51-115254 | 10/1976 |
| JP | 57-187175 | 11/1982 |
| JP | 58/023570 | 2/1983 |
| JP | 61-115680 | 6/1986 |
| JP | 08-309533 | 11/1996 |
| JP | 2004-268081 | 9/2004 |
| JP | 2007216282 A * | 8/2007 |
| JP | 2007-229775 | 9/2007 |
| JP | 2007-283393 | 11/2007 |
| JP | 2014-069226 | 4/2014 |

OTHER PUBLICATIONS

Search Report issued in PCT/JP2015/053495, dated May 12, 2015.
Office Action issued in Japanese Patent Application No. 2016-504040 dated Jan. 10, 2019 with an English translation.

* cited by examiner

ARC WELDING METHOD

TECHNICAL FIELD

The present invention relates to quality improvement of an arc welding method in which welding is performed in a spray transfer state by feeding a welding wire.

BACKGROUND ART

In each of MAG welding using a solid wire and mixed gas of argon gas and carbon dioxide gas as shield gas, arc welding using a flux-cored wire and carbon dioxide gas as shield gas, self-shield arc welding using a flux-cored wire for self-shield without using shield gas, and so on, a droplet transfer mode is a spray transfer mode. In the spray transfer mode, a tip of a welding wire is molten and becomes fine particles by arc heat, thereby being transferred to a molten pool. In the spray transfer mode, a droplet is transferred not by a short-circuiting transfer but by free falling.

In an arc welding based on the spray transfer mode (hereinafter referred to as spray transfer welding), a welding power supply of constant voltage characteristics is used and the welding wire is fed at a constant feeding rate. The spray transfer welding is characterized in that a generation amount of spatter is small and bead appearance is good. On the other hand, in the spray transfer welding, as an arc length is longer as compared with that in the short-circuiting transfer welding, an arc is configured in a spread shape and hence a penetration depth becomes shallow. In this respect, welding quality degrades depending on a work. Hereinafter, the spray transfer welding of a related art will be explained with reference to drawings.

FIG. 13 is a waveform diagram of voltage and current in typical spray transfer welding. (A) of this figure shows temporal change of a voltage setting signal Er for setting an output value of constant voltage characteristics of a welding power supply, (B) of this figure shows temporal change of a welding voltage Vw to be applied between a welding wire and base material, and (C) of this figure shows temporal change of a welding current Iw for generating an arc. Hereinafter explanation will be made with reference to this figure.

As shown in (A) of this figure, the voltage setting signal Er is set to a constant value. As shown in (B) of this figure, the welding voltage Vw fluctuates slightly up and down but has an almost constant value. As shown in (C) of this figure, the welding current Iw also fluctuates slightly up and down but has an almost constant value. An instantaneous value of the welding voltage Vw is set by the voltage setting signal Er. An average value of the welding current Iw is set by a feeding rate of the welding wire.

According to the invention of a patent literature 1, in each of spray transfer welding and globular transfer welding, the welding is performed in a manner of changing a welding current within a current amplitude range between 20 A or more and 100 A or less by cyclically changing an output voltage of a welding power supply within a frequency range between 100 Hz or more and 600 Hz or less. Consequently, according to the invention of the patent literature 1, in each of the spray transfer welding and the globular transfer welding, as fluctuation of an arc length can be suppressed. Further, as droplet can be transferred regularly and can be formed in fine particles, stability of a welding state can be improved.

PRIOR ART DOCUMENT

Patent Document

Patent Document 1: Japanese Patent Application Publication No. 2007-229775A

SUMMARY OF INVENTION

Problems to be Solved by Invention

Accordingly, an object of the present invention is to provide an arc welding method which can enlarge a penetration depth and achieve high quality in spray transfer welding.

Means for Solving Problems

In order to solve the aforesaid problem, according to the present invention, there is provided an arc welding method in which welding is performed in a spray transfer mode by feeding a welding wire, the method comprising: flowing a first welding current Iw1 during a first period, flowing a second welding current Iw2 during a second period and flowing a third welding current Iw3 during a third period, where $0<Iw2<Iw3<Iw1$, and alternately repeating the first to third periods.

According to the present invention, in the arc welding method, the third period is longer than each of the first period and the second period.

In the present invention, an inclination of the welding current upon change from the third welding current Iw3 to the first welding current Iw1 is gentle as compared with an inclination of the welding current upon change from the second welding current Iw2 to the third welding current Iw3.

In the present invention, an inclination of the welding current upon change from first welding current Iw1 to the second welding current Iw2 is gentle as compared with a predetermined reference inclination.

In the present invention, the third welding current Iw3 is a current which reduces with a lapse of time stepwise.

In the present invention, in a case where short circuit occurs between the welding wire and base material, the third period starts from a time where an arc is regenerated after the short circuit is released.

In the present invention, the second period and/or the second welding current Iw2 are changed according to a frequency of the short-circuit occurred between the welding wire and the base material.

In the present invention, an average value of a welding voltage is changed according to a frequency of the short circuit occurred between the welding wire and the base material.

In the present invention, the second period and/or the second welding current Iw2 are changed according to a time length of the short circuit occurred between the welding wire and the base material.

In the present invention, an average value of the welding voltage is changed according to the time length of the short circuit occurred between the welding wire and the base material.

Advantageous Effects of Invention

According to the present invention, during the first period, as a large arc pressure acts on a molten pool, the molten pool is formed in a concaved shape sank just beneath the wire and hence molten metal just beneath the wire becomes thin. Succeedingly, during the second period, an arc shape is deflated and the arc is concentrated on the thin portion of the molten metal just beneath the wire. Succeedingly, during a former half of the third period, the sank portion of the molten pool is concentrically heated by arc. During a latter half of the third period, as the arc pressure is constant, the sank portion of the molten pool vanishes and the molten pool is placed in a gentle state. According to the present invention, by alternately repeating the first to third periods, a penetration depth can be enlarged and high quality can be achieved in the spray transfer welding.

EMBODIMENTS OF INVENTION

Hereinafter embodiments according to the present invention will be explained with reference to drawings.

First Embodiment

Figure 1:
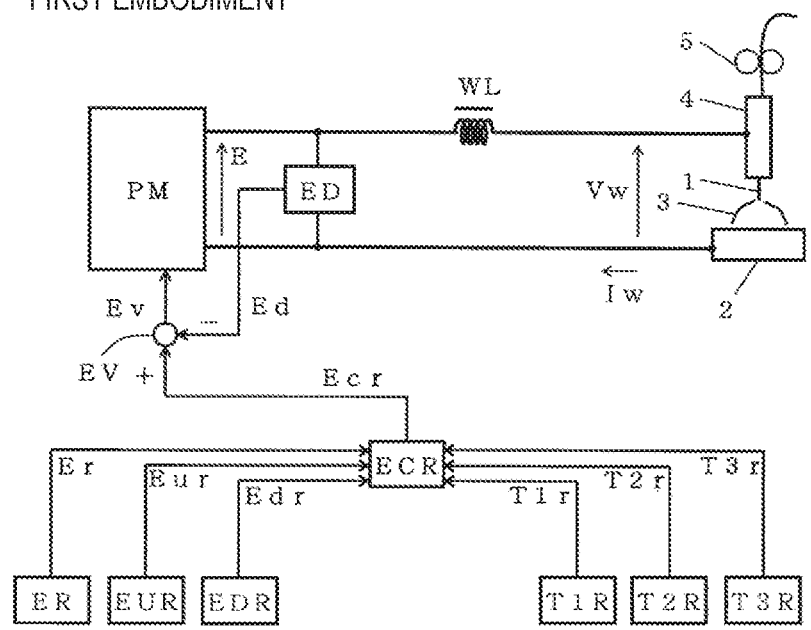
FIG. 1 A block diagram illustrating a welding power supply for implementing an arc welding method according to a first embodiment of the present invention.

FIG. 1 is a block diagram illustrating a welding power supply for implementing an arc welding method according to a first embodiment of the present invention. Hereinafter individual blocks will be explained with reference to this figure.

A power supply main circuit PM uses a power of three-phase 200V or the like from a commercial power supply (not shown) as an input, to subject the input power to output control such as inverter control according to a voltage error amplified signal Ev described later, and outputs an output voltage E. Although not shown in the figure, this power supply main circuit PM includes a primary rectifier circuit for rectifying the commercial power supply, a capacitor for smoothing the rectified DC, an inverter circuit for convening the smoothed DC into a high-frequency AC, a high-frequency transformer for stepping down the high-frequency AC to a voltage value suitable for arc welding, a secondary rectifier circuit for rectifying the stepped-down high-frequency AC, and a driving circuit which uses the voltage error amplified signal Ev as an input, to perform modulation control such as PWM control and drives the inverter circuit. A reactor WL smooths the output voltage E and outputs a welding voltage Vw.

A welding wire 1 is fed within a welding torch 4 in accordance with rotation of a feeding roll 5 coupled to a feeding motor (not shown), then an arc 3 is generated between this wire and base material 2, and thus welding is performed. The welding voltage Vw is applied between a power supply tip (not shown) within the welding torch 4 and the base material 2, and thus the welding current Iw flows through the arc 3.

A voltage setting circuit ER outputs a predetermined voltage setting signal Er. A voltage increasing value setting circuit EUR outputs a predetermined voltage increasing-value setting signal Eur. A voltage reducing value setting circuit EDR outputs a predetermined voltage reducing-value setting signal Edr.

A first period setting circuit T1R outputs a predetermined first period setting signal T1r. A second period setting circuit T2R outputs a predetermined second period setting signal T2r. A third period setting circuit T3R outputs a predetermined third period setting signal T3r.

A voltage control setting circuit ECR uses the voltage setting signal Er, the voltage increasing-value setting signal Eur, the voltage reducing-value setting signal Edr, the first period setting signal T1r, the second period setting signal T2r and the third period setting signal T3r as an input, to perform the following processing and outputs a voltage control setting signal Ecr.

1) During a first period T1 determined by the first period setting signal T1r, Ecr=Er+Eur is outputted.

2) Succeedingly, during a second period T2 determined by the second period setting signal T2r, Ecr=Er−Edr is outputted.

3) Succeedingly, during a third period T3 determined by the third period setting signal T3r, Ecr=Er is outputted.

4) The processings 1) to 3) are repeated.

An output voltage detection circuit ED detects the output voltage E and outputs an output voltage detection signal Ed. A voltage error amplifying circuit EV amplifies an error between the voltage control setting signal Ecr (+) and the output voltage detection signal Ed (−) and outputs a voltage error amplified signal Ev. This voltage error amplifier circuit EV subjects the welding power supply to constant voltage control.

Figure 2:
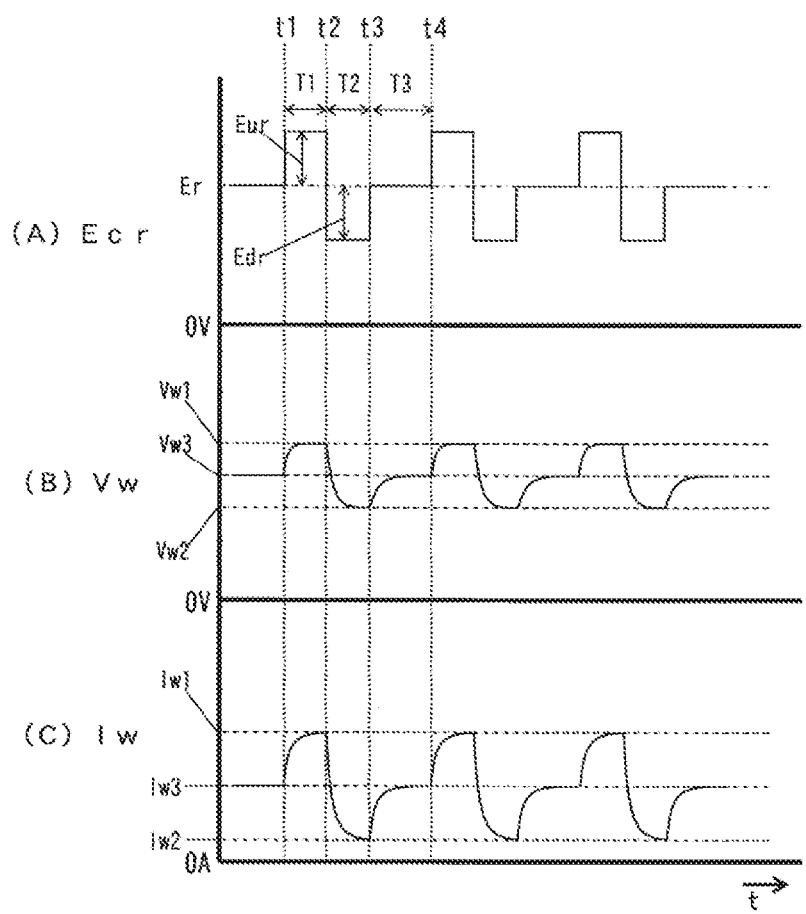
FIG. 2 A waveform diagram of voltage and current showing the arc welding method according to the first embodiment of the present invention.
Figure 13:
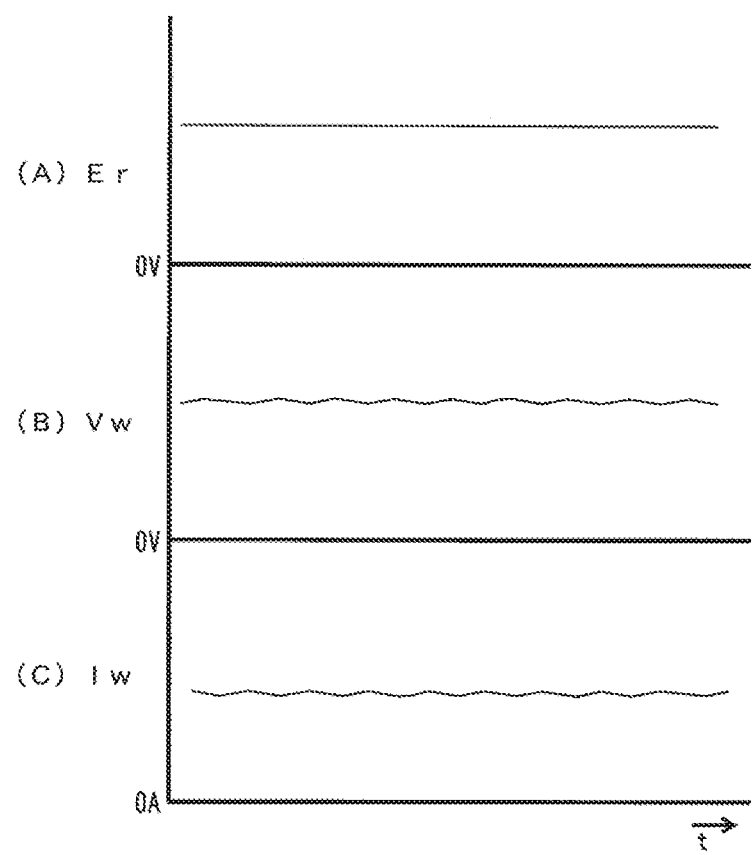
FIG. 13 A waveform diagram of voltage and current in a typical spray transfer welding of a related art.

FIG. 2 is a waveform diagram of voltage and current showing the arc welding method according to the first embodiment of the present invention. (A) of this figure shows temporal change of the voltage control setting signal Ecr, (B) of this figure shows temporal change of the welding voltage Vw, and (C) of this figure shows temporal change of the welding current Iw. This figure corresponds to FIG. 13 described above. Hereinafter explanation will be made with reference to this figure.

As shown in (A) of this figure, the voltage control setting signal Ecr has a waveform which is oscillated cyclically by the voltage control setting circuit ECR of FIG. 1. During the predetermined first period T1 from a time t1 to a time t2, this signal has a value obtained by adding the voltage increasing-value setting signal Eur to the voltage setting signal Er. During the predetermined second period T2 from the time t2 to a time t3, this signal has a value obtained by subtracting the voltage reducing-value setting signal Edr from the voltage setting signal Er. During the predetermined third period from the time t3 to a time t4, this signal has a value of the voltage setting signal Er. The voltage control setting signal Ecr has an oscillation waveform repeated at every single cycle from the time t1 to the time t4. Here, each of Er, Eur, Edr and Ecr is larger than 0.

As shown in (B) of this figure, the welding voltage Vw has an oscillation waveform because this voltage is set by the voltage control setting signal Ecr. During the first period T1 from the time t1 to the time t2, this voltage increases with an inclination from a third welding voltage value Vw3 and reaches a first welding voltage value Vw1 of an almost constant value. During the second period T2 from the time t2 to the time t3, this voltage reduces with an inclination from the first welding voltage value Vw1 and reaches a second welding voltage value Vw2 of an almost constant value. During the third period T3 from the time t3 to the time t4, this voltage increases with an inclination from the second welding voltage value Vw2 and reaches the third welding voltage value Vw3 of an almost constant value. The first welding voltage value Vw1 is set by Er+Eur, the second welding voltage value Vw2 is set by Er−Edr, and the third welding voltage value Vw3 is set by Er.

As shown in (C) of this figure, the welding current Iw is determined by the welding voltage Vw and an arc load. As the welding voltage Vw oscillates, the welding current has an oscillation waveform. During the first period T1 from the time t1 to the time t2, this current increases with an inclination from a third welding current value Iw3 and reaches a first welding current value Iw1 of an almost constant value. During the second period T2 from the time t2 to the time t3, this current reduces with an inclination from the first welding current value Iw1 and reaches a second welding current value of an almost constant value. During the third period T3 from the time t3 to the time t4, this current increases with an inclination from the second welding current value Iw2 and reaches the third welding current value Iw3 of an almost constant value. Here, a relation of $0<Iw2<Iw3<Iw1$ is satisfied.

In this figure, the individual inclinations upon change of the period are determined by a composite inductance value of the reactor WL of FIG. 1 and a welding cable. Thus, in the first embodiment, none of these inclinations can be set optionally.

Next, actions and effects of the individual periods will be explained. During the first period T1, as the welding current Iw becomes the first welding current value Iw1 of the largest value, a large arc pressure acts on a molten pool. Thus the molten pool is formed in a concaved shape sank just beneath the wire and hence molten metal just beneath the wire becomes thin. During the second period T2, as the welding current Iw becomes the second welding current value Iw2 of the smallest value, an arc shape is deflated and the arc is concentrated on the thin portion of the molten metal just beneath the wire. During the third period T3, as the welding current Iw becomes the third welding current value Iw3 of an intermediate value which is close to a welding current value determined by a feeding rate of the welding wire. By keeping the third welding current value Iw3 at the almost constant value, during a former half of the third period T3, the sank portion of the molten pool is concentrically heated by the arc. During a latter half of the third period, as the arc pressure is constant, the sank portion of the molten pool vanishes and the molten pool is placed in a gentle state. At a time shifting to the first period T1, if the molten pool is not in the gentle state, the molten pool just beneath the wire is not formed in the sank shape but a warped shape during the first period T1. Thus function and effects of enlarging the penetration depth is lost. In order to surely place the molten pool in the gentle state at a termination time of the third period T3, the third period T3 is desirably set to be longer than each of the first period T1 and the second period T2. According to the function and effects resulted from this arrangement, a deep penetration shape can be formed stably.

The first welding voltage value Vw1 (voltage increasing-value setting signal Eur) and the first period T1 (first period setting signal T1r) are set so that the molten pool is formed in the sank concave shape by the first welding current value Iw1. Further, the second welding voltage value Vw2 (voltage reducing-value setting signal Edr) and the second period T2 (second period setting signal T2r) are set so that, by the second welding current value Iw2, an arc shape is deflated and the arc is concentrated just beneath the wire. Further, the third welding voltage value Vw3 (voltage setting signal Er) and the third period T3 (third period setting signal T3r) are set so that, by the third welding current value Iw3, the molten pool is placed in the gentle state after the sank portion is concentrically heated. The welding current Iw is not subjected to constant current control so as to be the first welding current value Iw1 to the third welding current value Iw3. This is because the constant voltage control is necessary in order to keep an arc length to a suitable value. Thus the welding current Iw is indirectly set. Consequently, the first welding current value Iw1 to the third welding current value Iw3 vary slightly depending on an arc load state.

Next an example of numerical values will be raised. This example of the numerical values represents a case where a self-shield flux-cored wire (material: steel, diameter: 1.6 mm) is used as the welding wire, and the welding is performed by an average welding current of 250 A and an average welding voltage of 21V. Er, Eur and Edr are 21V, 10V and 10V, respectively. T1r, T2r and T3r are 2 ms, 4 ms and 5 ms, respectively. As a result, Vw1, Vw2 and Vw3 become 31V, 11V and 21V, respectively, and Iw1, Iw2 and Iw3 become 400 A, 60 A and 250 A, respectively.

According to the first embodiment, in a spray transfer welding, the first welding current Iw1 is flown during the first period, the second welding current Iw2 is flown during the second period and the third welding current Iw3 is flown during the third period in a state of $0<Iw2<Iw3<Iw1$, and the first to third periods are alternately repeated. During the first period, as the large arc pressure acts on the molten pool, the molten pool is formed in the concaved shape sank just beneath the wire and hence the molten metal just beneath the wire becomes thin. Succeedingly, during the second period, the arc shape is deflated and the arc is concentrated on the thin portion of the molten metal just beneath the wire. Succeedingly, during the former half of the third period, the sank portion of the molten pool is concentrically heated by the arc. During the latter half of the third period, as the arc pressure is constant, the sank portion of the molten pool vanishes and the molten pool is placed in the gentle state.

According to this embodiment, by alternately repeating these first to third periods, the penetration depth can be enlarged and high quality can be achieved in the spray transfer welding.

Second Embodiment

In a second embodiment according to the present invention, an inclination (first inclination K1) upon change from the third welding current Iw3 to the first welding current Iw1, an inclination (second inclination K2) upon change from the first welding current Iw1 to the second welding current Iw2 and an inclination (third inclination K3) upon change from the second welding current Iw2 to the third welding current Iw3 are respectively set to desired values in order to further improve the welding state.

Figure 3:
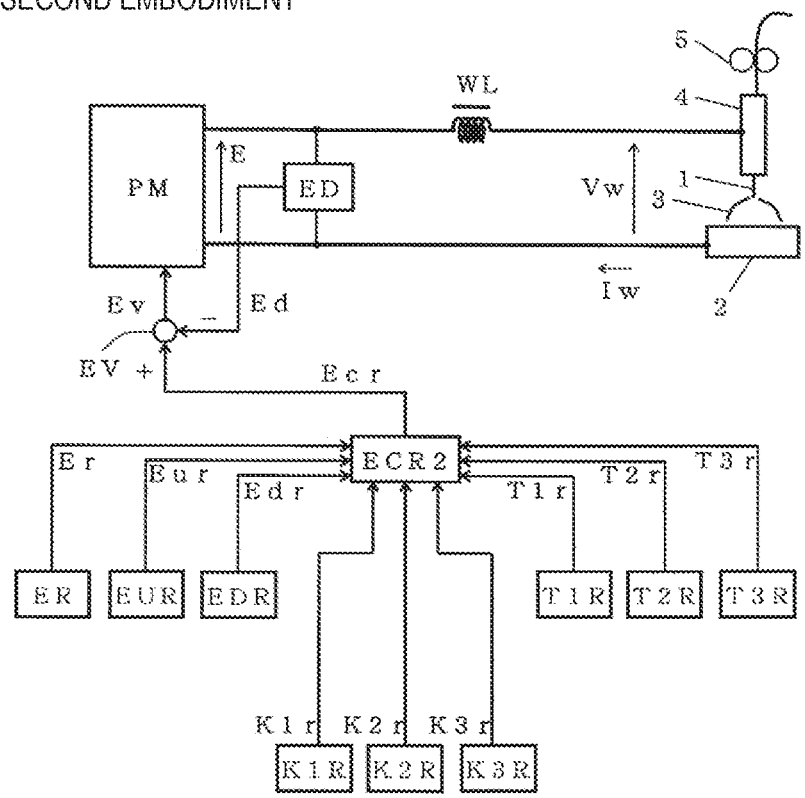
FIG. 3 A block diagram illustrating a welding power supply for implementing an arc welding method according to a second embodiment of the present invention.

FIG. 3 is a block diagram illustrating a welding power supply for implementing an arc welding method according to the second embodiment of the present invention. This figure corresponds to FIG. 1, and blocks identical to those of FIG. 1 are referred to by the same symbols, with explanation thereof being omitted. In this figure, a first inclination setting circuit K1R, a second inclination setting circuit K2R and a third inclination setting circuit K3R are added to FIG. 1, and the voltage control setting circuit ECR of FIG. 1 is replaced by a second voltage control setting circuit ECR2. Hereinafter these individual blocks will be explained with reference to this figure.

The first inclination setting circuit K1R, outputs a predetermined first inclination setting signal K1r. A second inclination setting circuit K2R outputs a predetermined second inclination setting signal K2r. The third inclination setting circuit K3R outputs a predetermined third inclination setting signal K3r.

The second voltage control setting circuit ECR2 uses the voltage setting signal Er, the voltage increasing-value setting signal Eur, the voltage reducing-value setting signal Edr, the first period setting signal T1r, the second period setting signal T2r, the third period setting signal T3r, the first inclination setting signal K1r, the second inclination setting signal K2r and the third inclination setting signal K3r as an input, to perform the following processing and outputs a voltage control setting signal Ecr.

1) When the first period T1 determined by the first period setting signal T1r starts, a value of the Ecr is increased from Er with an inclination determined by the first inclination setting signal K1r, then reaches Er+Eur and maintains this value.

2) Succeedingly, when the second period T2 determined by the second period setting signal T2r starts, a value of the Ecr is reduced from Er+Eur with an inclination determined by the second inclination setting signal K2r, then reaches Er+Edr and maintains this value.

3) Succeedingly, when the third period T3 determined by the third period setting signal T3r starts, a value of the Ecr is increased from Er−Edr with an inclination determined by the third inclination setting signal K3r, then reaches Er and maintains this value.

4) The processings 1) to 3) are repeated.

Figure 4:
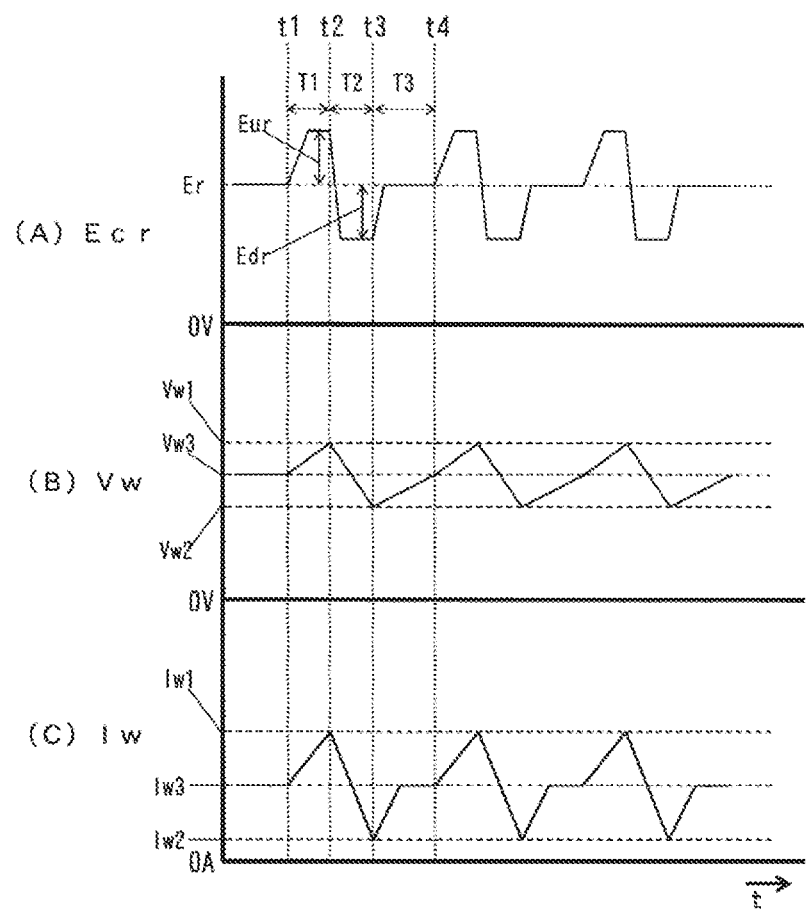
FIG. 4 A waveform diagram of voltage and current showing the arc welding method according to the second embodiment of the present invention.

FIG. 4 is a waveform diagram of voltage and current showing the arc welding method according to the second embodiment of the present invention. (A) of this figure shows temporal change of the voltage control setting signal Ecr, (B) of this figure shows temporal change of the welding voltage Vw, and (C) of this figure shows temporal change of the welding current Iw. This figure corresponds to FIG. 2, and explanation of portions of this figure same as those of FIG. 2 will not be repeated. Hereinafter different portions will be explained with reference to this figure.

As shown in (A) of this figure, the voltage control setting signal Ecr has a waveform which is oscillated cyclically by the second voltage control setting circuit ECR2 of FIG. 3. During a predetermined first period T1 from a time t1 to a time t2, this signal increases from Er with a predetermined first inclination K2, then reaches Er+Eur and maintains this value. During a predetermined second period from the time t2 to a time t3, this signal reduces from Er+Eur with a predetermined second inclination K2, then reaches Er−Edr and maintains this value. During a predetermined third period from the time t3 to a time t4, this signal increases from Er−Edr with a predetermined third inclination K3, then reaches Er and maintains this value. The voltage control setting signal Ecr has an oscillation waveform repeated at every single cycle from the time t1 to the time t4. Here, each of Er, Eur, Edr and Ecr is larger than 0.

As shown in (B) of this figure, the welding voltage Vw has an oscillation waveform because this voltage is set by the voltage control setting signal Ecr. During the first period T1 from the time t1 to the time t2, this voltage increases with a first inclination K1 from the third welding voltage value Vw3 and reaches the first welding voltage value Vw1 of the almost constant value. During the second period T2 from the time t2 to the time t3, this voltage reduces with a second inclination K2 from the first welding voltage value Vw1 and reaches the second welding voltage value Vw2 of the almost constant value. During the third period T3 from the time t3 to the time t4, this voltage increases with a third inclination K3 from the second welding voltage value Vw2 and reaches the third welding voltage value Vw3 of the almost constant value. The first welding voltage value Vw1 is set by Er+Eur, the second welding voltage value Vw2 is set by Er−Edr, and the third welding voltage value Vw3 is set by Er.

As shown in (C) of this figure, the welding current Iw is determined by the welding voltage Vw and an arc load. As the welding voltage Vw oscillates, the welding current has an oscillation waveform. During the first period T1 from the time t1 to the time t2, this current increases with a first inclination k1 from the third welding current value Iw3 and reaches the first welding current value Iw1 of the almost constant value. During the second period T2 from the time t2 to the time t3, this current reduces with a second inclination K2 from the first welding current value Iw1 and reaches the second welding current value Iw2 of the almost constant value. During the third period T3 from the time t3 to the time t4, this current increases with a third inclination K3 from the second welding current value Iw2 and reaches the third welding current value Iw3 of the almost constant value. Here, a relation of 0<Iw2<Iw3<Iw1 is satisfied.

The first inclination K1 is set by the first inclination setting signal K1r, the second inclination K2 is set by the second inclination setting signal K2r, and the third inclination K3 is set by the third inclination setting signal K3r.

Action and effects of each of the first inclination K1 to the third inclination K3 will be explained. If the first inclination K1 becomes too large, as the arc pressure changes so abruptly, spatter scatters from the molten pool. In contrast, if the first inclination K1 is too small, as the arc pressure changes so gently, the original action and effects of the first period T1 of forming the molten pool in the sank concave shape is lost. Thus a suitable range of the first inclination K1 is from 100 to 400 A/ms. On the other hand, the third inclination K3 is desirably larger than the first inclination K1 in order to quickly place the molten pool in the gentle state.

If the second inclination K2 is too large, arc interruption occurs due to undershoot of the welding current Iw. If the second inclination K2 is too small, the original action and effects of the second period T2 of quickly concentrating the arc just beneath the wire is lost. Thus the second inclination K2 is set to a value larger than an inclination (reference value) causing the arc interruption.

According to the second embodiment, the inclination (first inclination K1) upon change from the third welding current Iw3 to the first welding current Iw1, the inclination (second inclination K2) upon change from the first welding current Iw1 to the second welding current Iw2 and the inclination (third inclination K3) upon change from the second welding current Iw2 to the third welding current Iw3 are respectively set to the desired values. Consequently, in addition to the effects of the first embodiment, a generation amount of the spatter be made small and the occurrence of arc interruption can be suppressed.

Third Embodiment

A third embodiment according to the present invention is arranged to reduce the third welding current Iw3 with a lapse of time stepwise.

Figure 5:
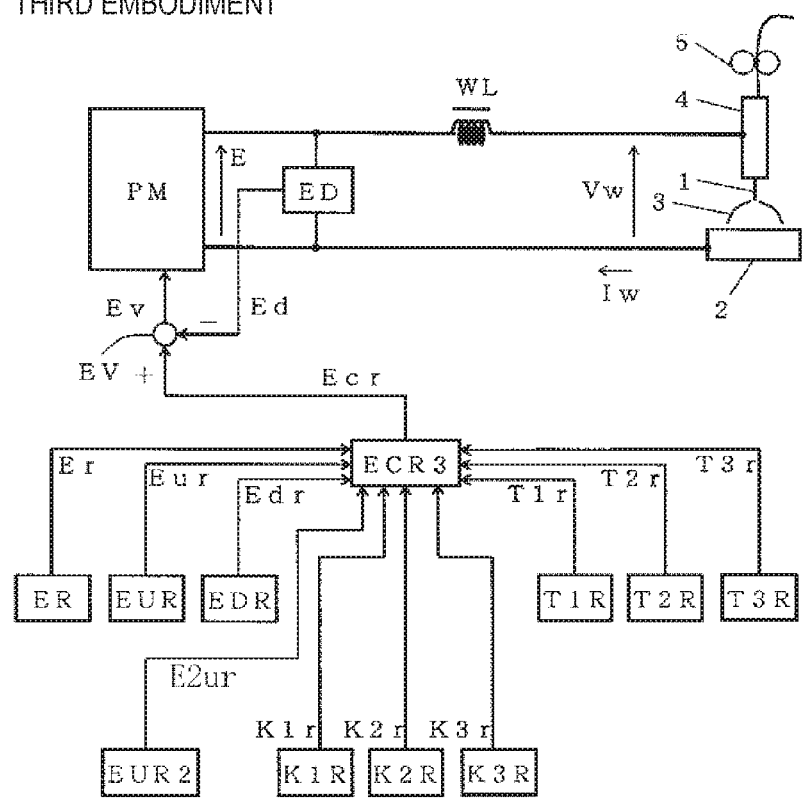
FIG. 5 A block diagram illustrating a welding power supply for implementing an arc welding method according to a third embodiment of the present invention.

FIG. 5 is a block diagram illustrating a welding power supply for implementing an arc welding method according to the third embodiment of the present invention. This figure corresponds to FIG. 3 (second embodiment), and blocks identical to those of FIG. 3 are referred to by the same symbols, with explanation thereof being omitted. In this figure, a second voltage increasing-value setting circuit EUR2 is added to FIG. 3, and the second voltage control setting circuit ECR2 of FIG. 3 is replaced by a third voltage control setting circuit ECR3. Hereinafter these individual blocks will be explained with reference to this figure.

The voltage increasing-value setting circuit EUR2 outputs a predetermined second voltage increasing-value setting signal E2ur.

The third voltage control setting circuit ECR3 uses the voltage setting signal Er, the voltage increasing-value setting signal Eur, the voltage reducing-value setting signal Edr, the first period setting signal T1r, the second period setting signal T2r, the third period setting signal T3r, the first inclination setting signal K1r, the second inclination setting signal K2r, the third inclination setting signal K3r and the second voltage increasing-value setting signal E2ur as an input, to perform the following processing and outputs a voltage control setting signal Ecr.

1) When the first period T1 determined by the first period setting signal T1r starts, a value of the Ecr is increased from Er with an inclination determined by the first inclination setting signal K1r, then reaches Er+Eur and maintains this value. This operation is same as that of FIG. 3.

2) Succeedingly, when the second period T2 determined by the second period setting signal T2r starts, a value of the Ecr is reduced from Er+Eur with an inclination determined by the second inclination setting signal K2r, then reaches Er−Edr and maintains this value. This operation is same as that of FIG. 3.

3) Succeedingly, when the third period T3 determined by the third period setting signal T3r starts, a value of the Ecr is increased from Er−Edr with an inclination determined by the third inclination setting signal K3r, then reaches Er+E2ur and maintains this value. When a predetermine period elapses after the start of the third period T3, a value of the Ecr starts reducing with a lapse of time stepwise, then reaches Er and maintains this value. Of course, the third period is longer than the predetermined period.

4) The processings 1) to 3) are repeated.

Figure 6:
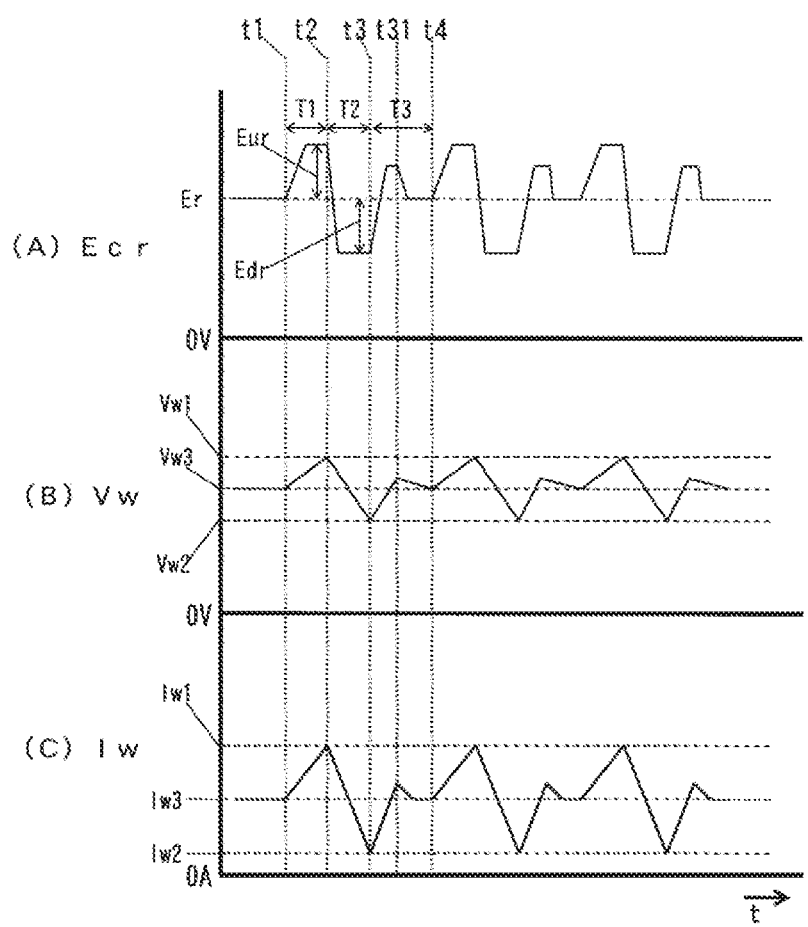
FIG. 6 A waveform diagram of voltage and current showing the arc welding method according to the third embodiment of the present invention.

FIG. 6 is a waveform diagram of voltage and current showing the arc welding method according to the third embodiment of the present invention. (A) of this figure shows temporal change of the voltage control setting signal Ecr, (B) of this figure shows temporal change of the welding voltage Vw, and (C) of this figure shows temporal change of the welding current Iw. This figure corresponds to FIG. 4, and as operations of periods other than the third period T3 are same as those of FIG. 4, the explanation thereof will be omitted. Hereinafter the operation of the third period T3 will be explained.

In this figure, the third period T3 is divided into a former period from the time t3 to a time t31 and a latter period from the time t31 to the time t4. The period from the time t3 to the time t31 is the predetermined period. As shown in (A) of this figure, the voltage control setting signal Ecr becomes Er+E2ur in the former period from the time t3 to the time t31, and becomes Er in the latter period from the time t31 to the time t4. In response to this, as shown in (B) of this figure, the welding voltage Vw has a waveform changing stepwise at the time t31. Further, as shown in (C) of this figure, the welding current Iw has a waveform also changing stepwise at the time t31.

As the third welding current value Iw3 is changed stepwise during the third period T3, an input heat amount increases and hence the penetration depth is further enlarged.

In addition to the aforesaid example of numerical values, if the second voltage increasing-value setting signal E2ur is set to 2V, the third welding voltage Vw3 becomes 23V in the former period and 21V in the latter period. The third welding current value Iw3 becomes 300 A in the former period and 250 A in the latter period. The predetermined period is set to 2 ms. Thus, as the third period T3 is 5 ms, the former period is 2 ms and the latter period is 3 ms.

According to the third embodiment, the third welding current Iw3 is reduced with a lapse of time stepwise. In this manner, according to this embodiment, as the input heat amount can be increased, the penetration depth can be further enlarged as compared with those of the first and second embodiments.

Fourth Embodiment

In a fourth embodiment according to the present invention, in a case where short circuit occurs between the welding wire and the base material, the third period T3 starts from a time where an arc is regenerated after the short circuit is released.

Figure 7:
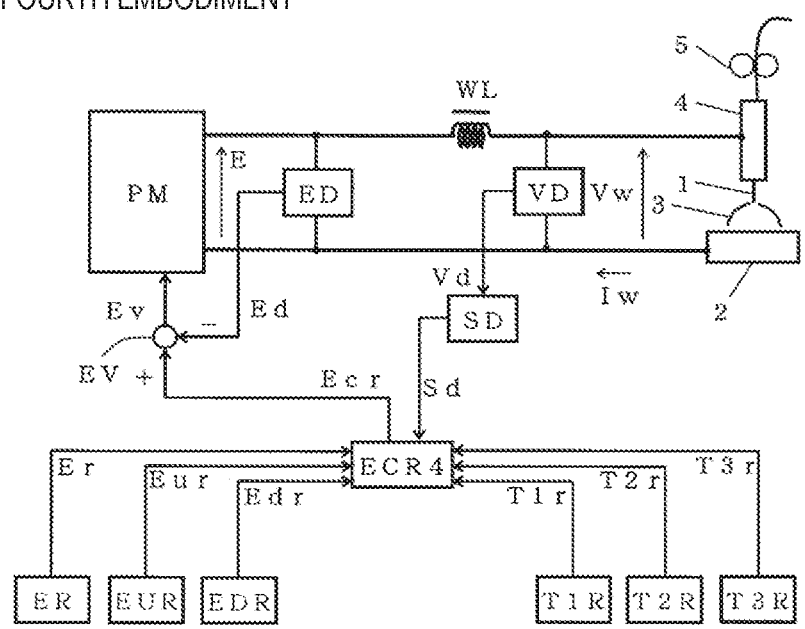
FIG. 7 A block diagram illustrating a welding power supply for implementing an arc welding method according to a fourth embodiment of the present invention.

FIG. 7 is a block diagram illustrating a welding power supply for implementing an arc welding method according to the fourth embodiment of the present invention. This figure corresponds to FIG. 1 (first embodiment), and blocks identical to those of FIG. 1 are referred to by the same symbols, with explanation thereof being omitted. In this figure, a welding voltage detection circuit VD and a short-circuit discrimination circuit SD are added to FIG. 1, and the voltage control setting circuit ECR of FIG. 1 is replaced by a fourth voltage control setting circuit ECR4. Hereinafter these individual blocks will be explained with reference to this figure.

The welding voltage detection circuit VD detects the welding voltage Vw and outputs a welding voltage detection signal Vd. The short-circuit discrimination circuit SD uses the welding voltage detection signal Vd as an input, to determine that a short circuit occurs between the welding wire 1 and the base material 2 when a value of this signal is less than a predetermined short-circuit discrimination value, and outputs a short-circuit discrimination signal Sd of a high level. The short-circuit discrimination signal Sd is at the high level in the case of the short circuit state, while at a low level in a case of an arc generation state. The short-circuit discrimination value is set to almost 10V.

The fourth voltage control setting circuit ECR4 uses the voltage setting signal Er, the voltage increasing-value setting signal Eur, the voltage reducing-value setting signal Edr, the first period setting signal T1r, the second period setting signal T2r, the third period setting signal T3r and the short-circuit discrimination signal Sd as an input, to perform the following processing and outputs a voltage control setting signal Ecr. The following processings 1) to 4) are same as those of the first embodiment, and a processing 5) is added.

1) During a first period T1 determined by the first period setting signal T1r, Ecr=Er+Eur is outputted.

2) Succeedingly, during a second period T2 determined by the second period setting signal T2r, Ecr=Er−Edr is outputted.

3) Succeedingly, during the third period T3 determined by the third period setting signal T3r, Ecr=Er is outputted.

4) The processings 1) to 3) are repeated.

5) When the short-circuit discrimination signal Sd changes to the low level (arc generation state) from the high level (short circuit state), the processing returns to the start point of the processing 3) from any of these periods, and thereafter the processings 1) to 3) are repeated.

Figure 8:
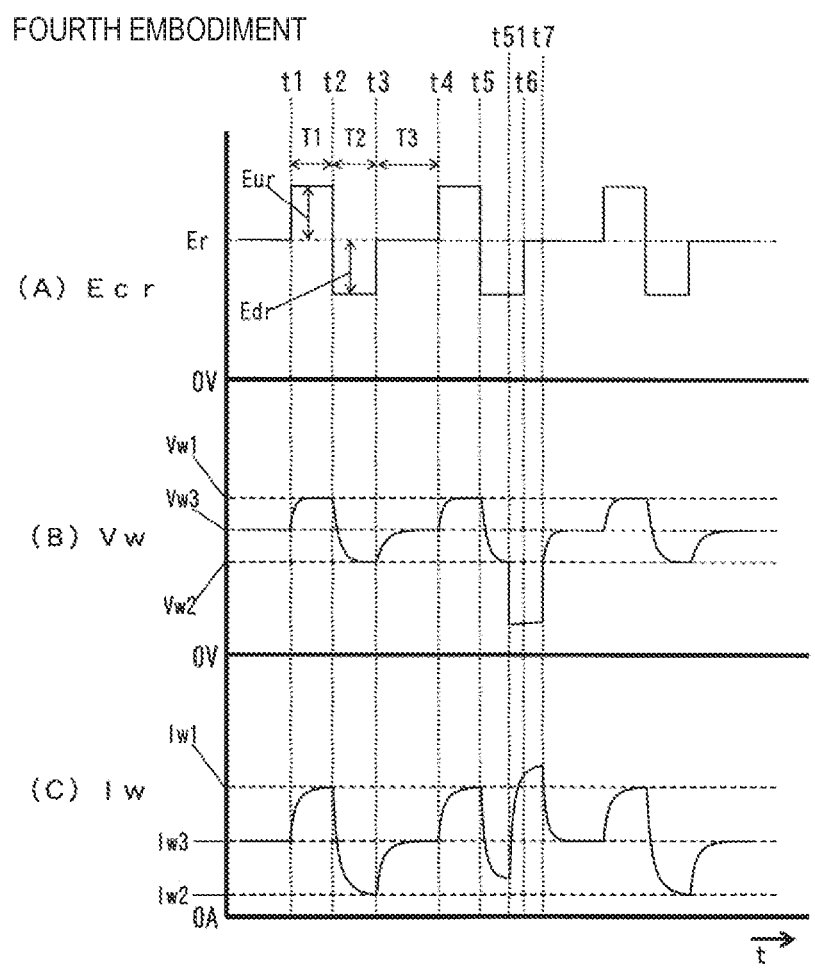
FIG. 8 A waveform diagram of voltage and current showing the arc welding method according to the fourth embodiment of the present invention.

FIG. 8 is a waveform diagram of voltage and current showing the arc welding method according to the fourth embodiment of the present invention. (A) of this figure shows temporal change of the voltage control setting signal Ecr, (B) of this figure shows temporal change of the welding voltage Vw, and (C) of this figure shows temporal change of the welding current Iw. This figure corresponds to FIG. 2, and explanation of portions of this figure same as those of FIG. 2 will not be repeated. Hereinafter different portions will be explained with reference to this figure.

As shown in (A) of this figure, the voltage control setting signal Ecr has a waveform which is oscillated cyclically by the fourth voltage control setting circuit ECR4 of FIG. 7. Like FIG. 2, during the predetermined first period T1 from a time t1 to a time t2, this signal has a value obtained by adding the voltage increasing-value setting signal Eur to the voltage setting signal Er. During the predetermined second period T2 from the time t2 to a time t3, this signal has a value obtained by subtracting the voltage reducing-value setting signal Edr from the voltage setting signal Er. During the predetermined third period T3 from the time t3 to a time t4, this signal has a value of the voltage setting signal Er. In response to this, like FIG. 2, the welding voltage Vw shown in (B) of this figure and the welding current Iw shown in (C) of this figure represent oscillation waveforms, respectively.

Then a period from the time t4 to a time t5 becomes the first period T1 again, and a period from the time t5 to a time t6 becomes the second period T2 again. If the welding wire 1 is short-circuited with the base material 2 at a time point t51 during the second period T2, the welding voltage Vw reduces to a short-circuit voltage value of a few volts as shown in (B) of this figure, whilst the welding current Iw increases gradually as shown in (C) of this figure because a load is changed to a short circuit load. If the short circuit is released and an arc is regenerated at a time t7 during the third period T3 starting from the time t6, the voltage control setting signal Ecr returns to the start point of the third period T3 as shown in (A) of this figure. That is, the third period T3 starts again from the time t7, and the first period T1 and the second period T2 succeed. In response to this, the welding voltage Vw shown in (B) of this figure and the welding current Iw shown in (C) of this figure become regular oscillation waveforms from the time t7, respectively.

According to the first embodiment, by alternately repeating the first period T1 to the third period T3, the penetration depth can be enlarged and high quality can be achieved in the spray transfer welding. However if short circuit occurs, action and effects resulted from the repetition of these periods is disturbed in its rhythm. Thus, in the fourth embodiment, when the short circuit is released and an arc is regenerated, a molten pool is restored to the gentle state by starting from the third period T3. In addition, as the repetition from the first period T1 is restarted, the welding state can be quickly shifted to a deep penetration obtainable state. Short circuit occurs sometimes due to disturbance such as a change of the height of the torch, a change of the feeding rate of the welding wire or irregular movement of the molten pool. Short circuit likely occurs during the second period T2 in which a value of the voltage control setting signal Ecr becomes minimum.

The fourth embodiment is based on the first embodiment and added with the processing upon occurrence of short circuit. In a case where this embodiment is based on one of the second and third embodiments and added with the processing upon occurrence of short circuit, as the action and effects of such the case is same as that of this embodiment, explanation thereof will be omitted.

According to the fourth embodiment, in a case where short circuit occurs between the welding wire and the base material, the third period T3 starts from the time where an arc is regenerated after the short circuit is released. Consequently, according to the fourth embodiment, in addition to the effects of the first to third embodiments, the welding state can be quickly restored to the original stable state even if short circuit occurs.

Fifth Embodiment

In a fifth embodiment according to the present invention, the second period T2 and/or the second welding current Iw2 are changed according to a frequency of short circuit occurred between the welding wire and the base material.

Figure 9:
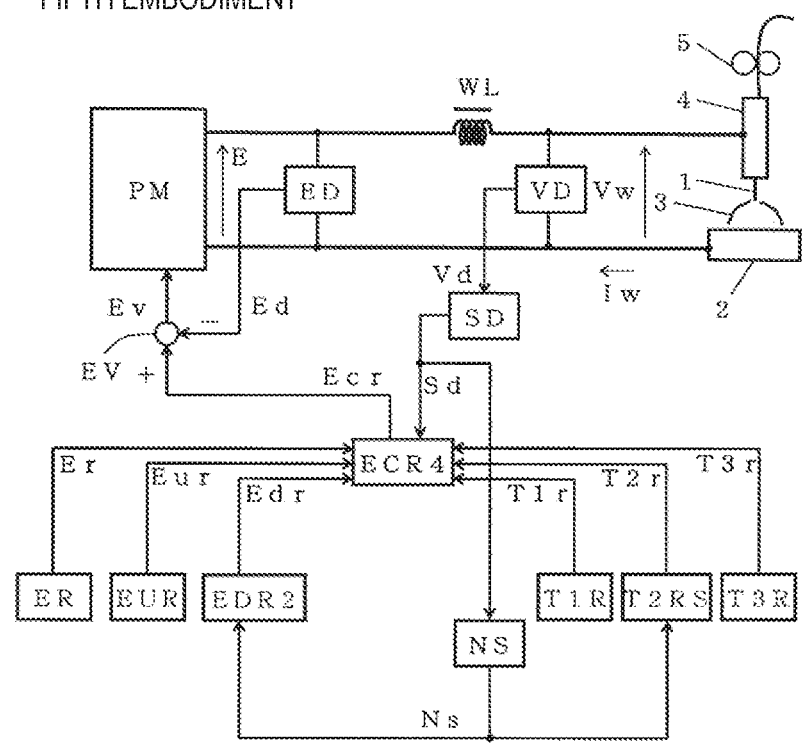
FIG. 9 A block diagram illustrating a welding power supply for implementing an arc welding method according to a fifth embodiment of the present invention.

FIG. 9 is a block diagram illustrating a welding power supply for implementing an arc welding method according to the fifth embodiment of the present invention. This figure corresponds to FIG. 7 (fourth embodiment), and blocks identical to those of FIG. 7 are referred to by the same symbols, with explanation thereof being omitted. In this figure, a short-circuit frequency detection circuit NS is added to FIG. 7, the voltage reducing-value setting circuit EDR of FIG. 7 is replaced by a second voltage reducing-value setting circuit EDR2, and the second period setting circuit T2R of FIG. 7 is replaced by a corrected second period setting circuit T2RS. Hereinafter these individual blocks will be explained with reference to this figure.

The short-circuit frequency detection circuit NS uses the short-circuit discrimination signal Sd as an input, to detect the number of short circuit per unit time and outputs the detection number as a short-circuit frequency detection signal Ns. Supporting that the unit time is one second, the short-circuit frequency detection signal Ns represents the number of short circuit per one second (number/sec).

The second voltage reducing-value setting circuit EDR2 uses the short-circuit frequency detection signal Ns as an input, to compare the short-circuit frequency detection signal Ns with a predetermined reference number at every unit time. If the short-circuit frequency detection signal Ns is the reference number or more, a predetermined voltage value is subtracted from a present value of the voltage reducing-value setting signal Edr, and a value obtained by the subtraction is outputted as the voltage reducing-value setting signal Edr. If the short-circuit frequency detection signal is less than the reference number, the predetermined voltage value is added to the present value of the voltage reducing-value setting signal Edr, and a value obtained by the addition is outputted as the voltage reducing-value setting signal. At a time of starting the welding, the voltage reducing-value setting signal Edr is set to a predetermined voltage reduction initial value. The voltage reducing-value setting signal Edr changes between the voltage reduction initial value as an upper limit and a value capable of maintaining the action and effects of the second period T2 as a lower limit. The reference number is set to about 1 to 10 times. The predetermined voltage value is set within a range of about 0.1 to 1.0V.

The second period setting circuit T2RS uses the short-circuit frequency detection signal Ns as an input, to compare the short-circuit frequency detection signal Ns with the reference number at every unit time. If the short-circuit frequency detection signal Ns is the reference number or more, a predetermined time is subtracted from a present value of the second period setting signal T2r, and a value obtained by the subtraction is outputted as the second period setting signal T2r. If the short-circuit frequency detection signal is less than the reference number, the predetermined period is added to the present value of the second period T2r, and a value obtained by the addition is outputted as the second period setting signal. At a time of starting the welding, the second period setting signal T2r is set to a predetermined second-period initial value. The second period setting signal T2r changes between the second period initial value as an upper limit and a value capable of maintaining the action and effects of the second period T2 as a lower limit. The predetermined time is set within a range of about 0.1 to 1.0 ms.

As a waveform diagram of voltage and current showing the arc welding method according to the fifth embodiment of the present invention is same as that of FIG. 8, explanation thereof will not be repeated. However, this embodiment differs in a point that each value of the voltage reducing-value setting signal Edr and the second period setting signal T2r changes automatically according to a value of the short-circuit frequency detection signal Ns.

The fifth embodiment is based on the fourth embodiment and added with the processing according to the short-circuit frequency detection signal Ns. In a case where this embodiment is based on one of the first to third embodiments and added with this processing, as the action and effects of such the case is same as that of this embodiment, explanation thereof will be omitted. In the fifth embodiment, although the explanation is made as to the case where each of the voltage reducing-value setting signal Edr and the second period setting signal T2r is changed, only either of these signals may be changed.

According to the fifth embodiment, the second period and/or the second welding current Iw2 are changed according to a frequency of short circuit occurred between the welding wire and the base material. The second welding current Iw2 is changed in a manner of changing the second welding voltage Vw2 by changing the voltage control setting signal Ecr during the second period. If an occurrence frequency of short circuit becomes high, as the function and effects of enlarging the penetration depth is frequently disturbed, stable deep penetration can not be obtained. Thus, in the fifth embodiment, an occurrence frequency of short circuit is lowered by automatically adjusting the second period and/or the second welding current Iw2 according to the occurrence frequency of short circuit. The second period and/or the second welding current Iw2 are adjusted because short circuit mainly occurs during the second period. As a result, according to the fifth embodiment, in addition to the effects of the first to fourth embodiments, penetration instability due to increase of an occurrence frequency of short circuit can be suppressed.

Sixth Embodiment

In a sixth embodiment according to the present invention, an average value of the welding voltage is changed according to a frequency of short circuit occurred between the welding wire and the base material.

Figure 10:
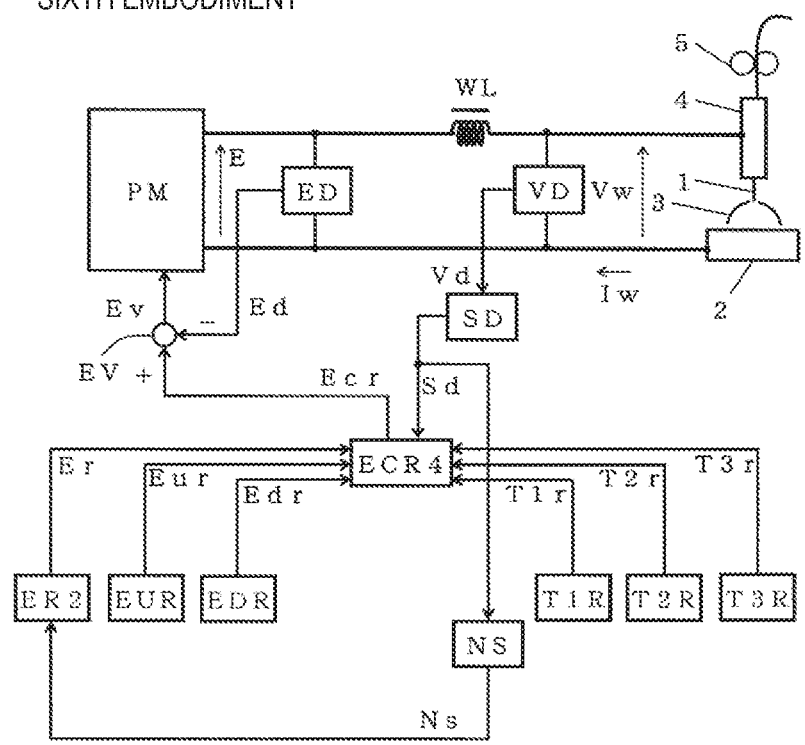
FIG. 10 A block diagram illustrating a welding power supply for implementing an arc welding method according to a sixth embodiment of the present invention.

FIG. 10 is a block diagram illustrating a welding power supply for implementing an arc welding method according to the sixth embodiment of the present invention. This figure corresponds to FIG. 7 (fourth embodiment), and blocks identical to those of FIG. 7 are referred to by the same symbols, with explanation thereof being omitted. In this figure, a short-circuit frequency detection circuit NS is added to FIG. 7 and the voltage setting circuit ER of FIG. 7 is replaced by a second voltage setting circuit ER2. Hereinafter these individual blocks will be explained with reference to this figure.

The short-circuit frequency detection circuit NS uses the short-circuit discrimination signal Sd as an input, to detect the number of short circuit per unit time and outputs the detection number as a short-circuit frequency detection signal Ns. Supporting that the unit time is one second, the short-circuit frequency detection signal Ns represents the number of short circuit per one second (number/sec). This circuit has the same circuit configuration as the short-circuit frequency detection circuit NS of FIG. 9.

The second voltage setting circuit ER2 uses the short-circuit frequency detection signal Ns as an input, to compare the short-circuit frequency detection signal Ns with a predetermined reference number at every unit time. If the short-circuit frequency detection signal Ns is the reference number or more, a predetermined voltage value is added to a present value of the voltage setting signal Er, and a value obtained by the addition is outputted as the voltage setting signal Er. If the short-circuit frequency detection signal is less than the reference number, the predetermined voltage value is subtracted from the present value of the voltage setting signal Er, and a value obtained by the subtraction is outputted as the voltage setting signal. At a time of starting the welding, the voltage setting signal Er is set to a predetermined voltage-setting initial value. The voltage setting signal Er changes so as not to be lower than the voltage-setting initial value as a lower limit. The reference number is set to about 1 to 10 times. The predetermined voltage value is set within a range of about 0.1 to 1.0V.

As a waveform diagram of voltage and current showing the arc welding method according to the sixth embodiment of the present invention is same as that of FIG. 8, explanation thereof will not be repeated. However, this embodiment differs in a point that a value of the voltage setting signal Er changes automatically according to a value of the short-circuit frequency detection signal Ns. If the voltage setting signal Er changes, as the waveform of the voltage control setting signal Ecr shown in (A) of this figure shifts in a parallel direction elevationally, an average value of the welding voltage is changed. Consequently, a state where short circuit occurs scarcely can be achieved.

The sixth embodiment is based on the fourth embodiment and added with the processing according to the short-circuit frequency detection signal Ns. In a case where this embodiment is based on one of the first to third embodiments and added with this processing, as the action and effects of such the case is same as that of this embodiment, explanation thereof will be omitted.

According to the sixth embodiment, an average value of the welding voltage is changed according to a frequency of short circuit occurred between the welding wire and the base material. An average value of the welding voltage is changed in a manner of changing the voltage control setting signal Ecr by changing the voltage setting signal Er. If an occurrence frequency of short circuit becomes high, as the function and effects of enlarging the penetration depth is frequently disturbed, stable deep penetration cannot be obtained. Thus, in the sixth embodiment, an occurrence frequency of short circuit is lowered by automatically adjusting an average value of the welding voltage according to the occurrence frequency of short circuit. As a result, according to the sixth embodiment, in addition to the effects of the first to fourth embodiments, penetration instability due to increase of an occurrence frequency of short circuit can be suppressed.

Seventh Embodiment

In a seventh embodiment according to the present invention, the second period T2 and/or the second welding current Iw2 are changed according to a time length of short circuit occurred between the welding wire and the base material.

Figure 11:
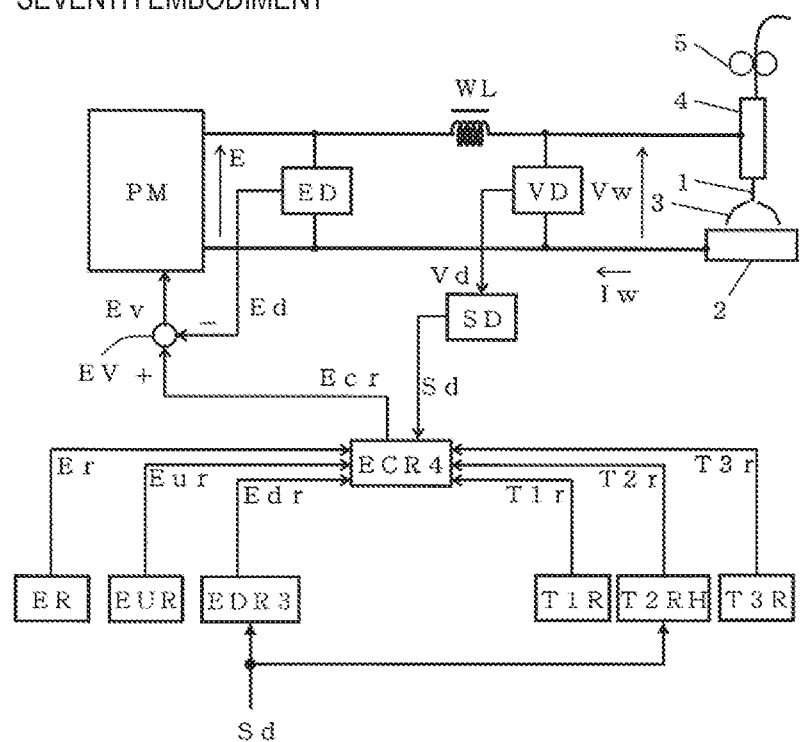
FIG. 11 A block diagram illustrating a welding power supply for implementing an arc welding method according to a seventh embodiment of the present invention.

FIG. 11 is a block diagram illustrating a welding power supply for implementing an arc welding method according to the seventh embodiment of the present invention. This figure corresponds to FIG. 7 (fourth embodiment), and blocks identical to those of FIG. 7 are referred to by the same symbols, with explanation thereof being omitted. In this figure, the voltage reducing-value setting circuit EDR of FIG. 7 is replaced by a third voltage reducing-value setting circuit EDR3, and the second period setting circuit T2R of FIG. 7 is replaced by a revised second period setting circuit T2RH. Hereinafter these individual blocks will be explained with reference to this figure.

The third voltage reducing-value setting circuit EDR3 uses the short-circuit discrimination signal Sd as an input, and, if the short-circuit discrimination signal Sd is at the high level (short circuit), outputs the voltage reducing-value setting signal Edr in a manner of gradually reducing a present value of the voltage reducing-value setting signal Edr with a lapse of time during a short circuiting period. If the short-circuit discrimination signal is at the low level (arc), the third voltage reducing-value setting circuit outputs the voltage reducing-value setting signal in a manner of gradually increasing the present value of the voltage reducing-value setting signal Edr with a lapse of time during an arc period. At a time of starting the welding, the voltage reducing-value setting signal Edr is set to a predetermined voltage reduction initial value. The voltage reducing-value setting signal Edr changes between the voltage reduction initial value as an upper limit and a value capable of maintaining the action and effects of the second period T2 as a lower limit. For example, the voltage reducing-value setting signal Edr is reduced at a reducing rate of −0.2V/ms during a short circuiting period, whilst increased at an increasing rate of +0.05V/100 ms during an arc period.

The revised second period setting circuit T2RH uses the short-circuit discrimination signal Sd as an input, and, if the short-circuit discrimination signal Sd is at the high level (short circuit), outputs the second period setting signal T2r in a manner of gradually reducing a present value of the second period setting signal T2r with a lapse of time during a short circuiting period. If the short-circuit discrimination signal is at the low level (arc), the revised second period setting circuit outputs the second period setting signal in a manner of gradually increasing the present value of the second period setting signal T2r with a lapse of time during an arc period. At a time of starting the welding, the second period setting signal T2r is set to a predetermined second period initial value. The second period setting signal T2r changes between the second period initial value as an upper limit and a value capable of maintaining the action and effects of the second period T2 as a lower limit. For example, the second period setting signal T2r is reduced at a reducing rate of −0.1 ms/ms during a short circuiting period, whilst increased at an increasing rate of +0.02 ms/100 ms during an arc period.

As a waveform diagram of voltage and current showing the arc welding method according to the seventh embodiment of the present invention is same as that of FIG. 8, explanation thereof will not be repeated. However, this embodiment differs in a point that each value of the voltage reducing-value setting signal Edr and the second period setting signal T2r changes automatically based on the short-circuit discrimination signal Sd.

The seventh embodiment is based on the fourth embodiment and added with the processing according to the short-circuit discrimination signal Sd. In a case where this embodiment is based on one of the first to third embodiments and added with this processing, as the action and effects of such the case is same as that of this embodiment, explanation thereof will be omitted. In the seventh embodiment, although the explanation is made as to the case where each of the voltage reducing-value setting signal Edr and the second period setting signal T2r is changed, only either of these signals may be changed.

According to the seventh embodiment, the second period and/or the second welding current Iw2 are changed according to a time length of short circuit occurred between the welding wire and the base material. The second welding current Iw2 is changed in a manner of changing the second welding voltage Vw2 by changing the voltage control setting signal Ecr during the second period. If a time length of short circuit becomes long, as the function and effects of enlarging the penetration depth is obstructed, stable deep penetration cannot be obtained. Thus, in the seventh embodiment, short circuit of a long time is prevented occurring by automatically adjusting the second period and/or the second welding current Iw2 according to a time length of short circuit. The second period and/or the second welding current Iw2 are adjusted because short circuit mainly occurs during the second period. As a result, according to the seventh embodiment, in addition to the effects of the first to fourth embodiments, penetration instability due to increase of a time length of short circuit can be suppressed.

Eighth Embodiment

In an eighth embodiment according to the present invention, an average value of the welding voltage is changed according to a time length of short circuit occurred between the welding wire and the base material.

Figure 12:
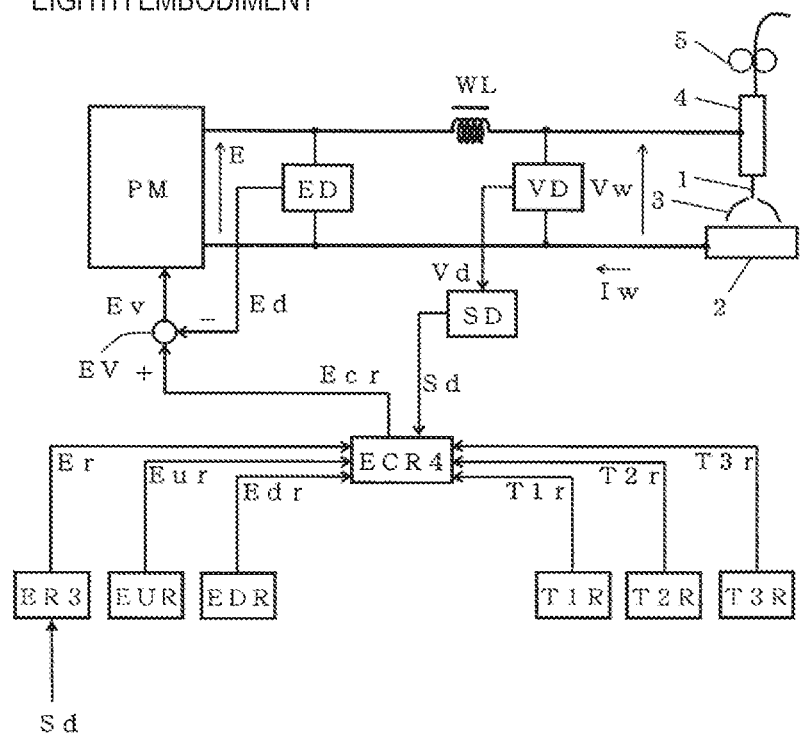
FIG. 12 A block diagram illustrating a welding power supply for implementing an arc welding method according to an eighth embodiment of the present invention.

FIG. 12 is a block diagram illustrating a welding power supply for implementing an arc welding method according to the eighth embodiment of the present invention. This figure corresponds to FIG. 7 (fourth embodiment), and blocks identical to those of FIG. 7 are referred to by the same symbols, with explanation thereof being omitted. In this figure, the voltage setting circuit ER of FIG. 7 is replaced by a third voltage setting circuit ER3. Hereinafter the individual blocks will be explained with reference to this figure.

The third voltage setting circuit ER3 uses the short-circuit discrimination signal Sd as an input, and, if the short-circuit discrimination signal Sd is at the high level (short circuit), outputs the voltage setting signal Er in a manner of gradually increasing a present value of the voltage setting signal Er with a lapse of time during a short circuiting period. If the short-circuit discrimination signal is at the low level (arc), the third voltage setting circuit outputs the voltage setting signal in a manner of gradually reducing the present value of the voltage setting signal Er with a lapse of time during an arc period. At a time of starting the welding, the voltage setting signal Er is set to a predetermined voltage setting initial value. The voltage setting signal Er changes so as not to be lower than the voltage setting initial value as a lower limit. For example, the voltage setting signal Er is increased at an increasing rate of +0.2V/ms during a short circuiting period, whilst reduced at a reducing rate of −0.05V/100 ms during an arc period.

As a waveform diagram of voltage and current showing the arc welding method according to the eighth embodiment of the present invention is same as that of FIG. 8, explanation thereof will not be repeated. However, this embodiment differs in a point that a value of the voltage setting signal Er changes automatically according to the short-circuit discrimination signal Sd. If the voltage setting signal Er changes, as the waveform of the voltage control setting signal Ecr shown in (A) of this figure shifts in a parallel direction elevationally, an average value of the welding voltage is changed. Consequently, short circuit of a long time is prevented occurring.

The eighth embodiment is based on the fourth embodiment and added with the processing according to the short-circuit discrimination signal Sd. In a case where this embodiment is based on one of the first to third embodiments and added with this processing, as the action and effects of such the case is same as that of this embodiment, explanation thereof will be omitted.

According to the eighth embodiment, an average value of the welding voltage is changed according to a time length of short circuit occurred between the welding wire and the base material. An average value of the welding voltage is changed in a manner of changing the voltage control setting signal Ecr by changing the voltage setting signal Er. If a time length of short circuit becomes long, as the function and effects of enlarging the penetration depth is obstructed, stable deep penetration can not be obtained. Thus, in the eighth embodiment, short circuit of a long time is prevented occurring by automatically adjusting an average value of the welding voltage according to a time length of short circuit. As a result, according to the eighth embodiment, in addition to the effects of the first to fourth embodiments, penetration instability due to increase of a time length of short circuit can be suppressed.

INDUSTRIAL APPLICABILITY

According to the present invention, high quality can be achieved in the arc welding method in which the welding is performed in the spray transfer state by feeding the welding wire.

Although the present invention is explained with reference to the particular embodiments, the present invention is not limited thereto but the embodiments may be changed in various manners within a range not departing from the technical concept disclosed in the present invention.

This application is based on Japanese Patent Application (Japanese Patent Application No. 2014-032968) filed on Feb. 24, 2014, the content of which is incorporated herein by reference.

DESCRIPTION OF REFERENCE NUMERALS 1 welding wire
2 base material
3 arc
4 welding torch
5 feeding roll
E output voltage
E2ur second voltage increasing-value setting signal
ECR voltage control setting circuit
Ecr voltage control setting signal
ECR2 second voltage control setting circuit
ECR3 third voltage control setting circuit
ECR4 fourth voltage control setting circuit
ED output voltage detection circuit
Ed output voltage detection signal
EDR voltage reducing value setting circuit
Edr voltage reducing-value setting signal
EDR2 second voltage reducing-value setting circuit
EDR3 third voltage reducing-value setting circuit
ER voltage setting circuit
Er voltage setting signal
ER2 second voltage setting circuit
ER3 third voltage setting circuit
EUR voltage increasing-value setting circuit
Eur voltage increasing-value setting signal
EUR2 second voltage increasing-value setting circuit
EV voltage error amplifying circuit
Ev voltage error amplified signal
Iw welding current
Iw1 first welding current
Iw2 second welding current
Iw3 third welding current
K1 first inclination
K1R first inclination setting circuit
K1r first inclination setting signal
K2 second inclination
K2R second inclination setting circuit
K2r second inclination setting signal
K3 third inclination
K3R third inclination setting circuit
K3r third inclination setting signal
NS short-circuit frequency detection circuit
Ns short-circuit frequency detection signal
PM power supply main circuit
SD short-circuit discrimination circuit
Sd short-circuit discrimination signal
T1 first period
T1R first period setting circuit
T1r first period setting signal
T2 second period T2R second period setting circuit
T2r second period setting signal
T2RS corrected second period setting circuit
T2RH revised second period setting circuit
T3 third period
T3R third period setting circuit
T3r third period setting signal
VD welding voltage detection circuit
Vd welding voltage detection signal
Vw welding voltage
Vw1 first welding voltage value
Vw2 second welding voltage value
Vw3 third welding voltage value
WL reactor

The invention claimed is:

1. An arc welding method in which welding is performed in a spray transfer mode by feeding a welding wire, the method comprising:
performing arc welding such that a droplet is transferred by free falling in the spray transfer mode, the arc welding in the spray transfer mode is performed by flowing a first welding current Iw1 during a first period, flowing a second welding current Iw2 during a second period and flowing a third welding current Iw3 during a third period, where 0<Iw2<Iw3<Iw1, and alternately repeating the first to third periods, such that the first welding current subsequently follows the third welding current, wherein
the first welding current is greater than the third welding current throughout an entirety of the first period, and
a slope of the welding current upon change from the third welding current Iw3 to the first welding current Iw1 is less than a slope of the welding current upon change from the second welding current Iw2 to the third welding current Iw3.

2. The arc welding method according to claim 1, wherein the third period is longer than each of the first period and the second period.

3. The arc welding method according to claim 1, wherein in a case where a short circuit occurs between the welding wire and a base material, the third period starts from a time where an arc is regenerated after the short circuit is released.

4. An arc welding method in which welding is performed in a spray transfer mode by feeding a welding wire, the method comprising:
performing arc welding such that a droplet is transferred by free falling in the spray transfer mode, the arc welding in the spray transfer mode is performed by flowing a first welding current Iw1 during a first period, flowing a second welding current Iw2 during a second period and flowing a third welding current Iw3 during a third period, where 0<Iw2<Iw3<Iw1, and alternately repeating the first to third periods, such that the first welding current subsequently follows the third welding current,
wherein the first welding current is greater than the third welding current throughout an entirety of the first period, and
wherein a slope of the welding current upon change from first welding current Iw1 to the second welding current Iw2 is less than a predetermined reference slope.

5. The arc welding method according to claim 4, wherein the third period is longer than each of the first period and the second period.

6. The arc welding method according to claim 4, wherein in a case where a short circuit occurs between the welding wire and a base material, the third period starts from a time where an arc is regenerated after the short circuit is released.

7. An arc welding method in which welding is performed in a spray transfer mode by feeding a welding wire, the method comprising:
performing arc welding such that a droplet is transferred by free falling in the spray transfer mode, the arc welding in the spray transfer mode is performed by flowing a first welding current Iw1 during a first period, flowing a second welding current Iw2 during a second period and flowing a third welding current Iw3 during a third period, where 0<Iw2<Iw3<Iw1, and alternately repeating the first to third periods, such that the first welding current subsequently follows the third welding current,
wherein the first welding current is greater than the third welding current throughout an entirety of the first period, and
wherein the third welding current Iw3 is a current which is not constant during the third period and reduces during a portion of the third period.

8. The arc welding method according to claim 7, wherein the third period is longer than each of the first period and the second period.

9. The arc welding method according to claim 7, wherein in a case where a short circuit occurs between the welding wire and a base material, the third period starts from a time where an arc is regenerated after the short circuit is released.

* * * * *